(12) United States Patent  
Linn

(10) Patent No.: US 7,161,504 B2
(45) Date of Patent: Jan. 9, 2007

(54) NAVIGATION SYSTEM FOR FINDING OPTIMUM ROUTE USING TRAFFIC INCIDENTS INFORMATION

(75) Inventor: Jian-Liang Linn, Rowland Heights, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/356,221

(22) Filed: Jan. 31, 2003

(65) Prior Publication Data

US 2004/0150534 A1 Aug. 5, 2004

(51) Int. Cl.
*G08G 1/123* (2006.01)
(52) U.S. Cl. ............................. 340/995.13; 340/995.19
(58) Field of Classification Search ........... 340/995.13, 340/995.16, 995.19, 995.1, 990
See application file for complete search history.

(56) References Cited

U.S. PATENT DOCUMENTS

| 5,220,507 | A | * | 6/1993 | Kirson | 701/202 |
| 5,412,573 | A | * | 5/1995 | Barnea et al. | 701/211 |
| 5,699,056 | A | * | 12/1997 | Yoshida | 340/905 |
| 5,801,646 | A | | 9/1998 | Pena | |
| 5,864,305 | A | * | 1/1999 | Rosenquist | 340/905 |
| 5,911,773 | A | * | 6/1999 | Mutsuga et al. | 701/200 |
| 5,982,298 | A | * | 11/1999 | Lappenbusch et al. | 340/905 |
| 6,012,012 | A | | 1/2000 | Fleck et al. | |
| 6,150,961 | A | | 11/2000 | Alewine et al. | |
| 6,151,550 | A | | 11/2000 | Nakatani | |
| 6,175,803 | B1 | * | 1/2001 | Chowanic et al. | 701/209 |
| 6,178,374 | B1 | | 1/2001 | Mohlenkamp et al. | |
| 6,205,400 | B1 | | 3/2001 | Lin | |
| 6,246,948 | B1 | | 6/2001 | Thakker | |
| 6,255,963 | B1 | | 7/2001 | Heimann et al. | |
| 6,275,231 | B1 | * | 8/2001 | Obradovich | 345/970 |
| 6,298,301 | B1 | | 10/2001 | Kim | |
| 6,351,709 | B1 | * | 2/2002 | King et al. | 701/210 |
| 6,356,839 | B1 | | 3/2002 | Monde et al. | |
| 6,438,561 | B1 | | 8/2002 | Israni et al. | |
| 6,603,405 | B1 | * | 8/2003 | Smith | 340/905 |
| 6,615,130 | B1 | * | 9/2003 | Myr | 701/117 |
| 6,812,888 | B1 | * | 11/2004 | Drury et al. | 342/357.13 |
| 6,850,842 | B1 | * | 2/2005 | Park | 701/210 |
| 6,865,480 | B1 | * | 3/2005 | Wong | 340/995.13 |
| 2004/0104842 | A1 | * | 6/2004 | Drury et al. | 342/357.13 |

* cited by examiner

*Primary Examiner*—Daniel Wu
*Assistant Examiner*—Eric M. Blount
(74) *Attorney, Agent, or Firm*—Muramatsu & Associates

(57) ABSTRACT

A navigation system for finding an optimum route to the destination using traffic incidents information provides a novel approach to enable a user easily and quickly to select which incidents should be avoided. The user can easily identify the important traffic incidents because the system can display only the traffic incidents on the calculated route as well as all the traffic incidents in the converged area. The user can select the incident to receive more detailed information including a live image of the traffic incident and specify one or more incidents to be avoided on the route to the destination. The system calculates a new optimum route to avoid the specified traffic incidents. The traffic incidents are illustrated on the navigation system by two or more different icons representing predefined types of traffic incidents

18 Claims, 21 Drawing Sheets

FIG. 3A
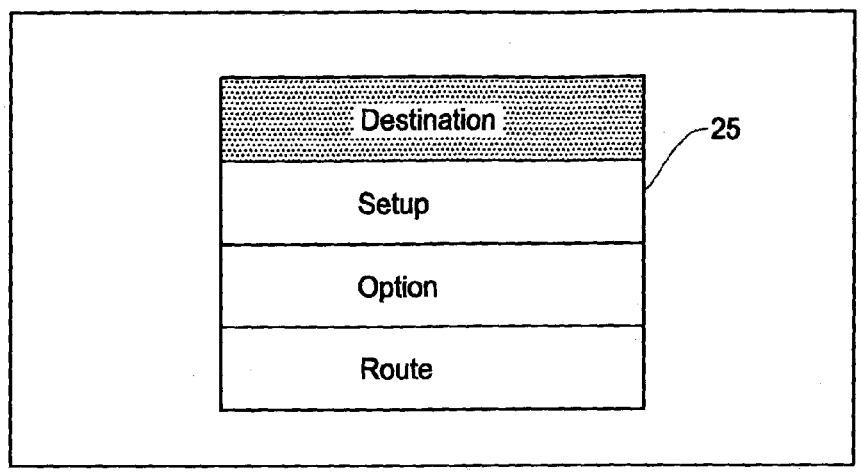
FIG. 3B
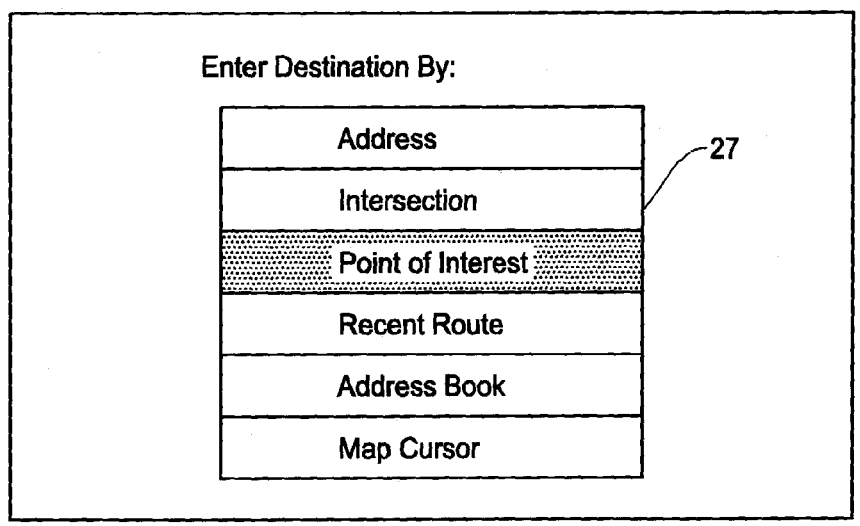
FIG. 3C
Category List      28
| Recreation | Input Category |
|---|---|
| Bank | Hotel |
| Emergency | Gas Station |
| Restaurant | Shopping |
| Travel | Automotive |
| Park | Theater |

FIG. 9

| Traffic Incident List |
|---|
| Avoid Selected Incidents |
| Avoid All Incidents |
| I-10 West Bound, Traffic Jam |
| I-605 South Bound, Congestion |
| CA-91 West Bound, Slow Traffic |
| CA-91 West Bound, before I-710 Construction |
| I-405 North Bound, Accidents |
| I-405 North Bound, Stall Big Rig |

Traffic Incident List — 87

| Avoid All Incidents | Avoid Selected Incidents |
|---|---|
| 🚚 I-10 West Bound, Traffic Jam | |
| 🚚 I-605 South Bound, Congestion | |
| 🚚 CA-91 West Bound, Slow Traffic | |
| 🚧 CA-91 West Bound, before I-710 Construction | |
| 🚚 I-405 North Bound, Accidents | |
| 🚚 I-405 North Bound, Stall Big Rig | |

Fig. 11B

Traffic Incident List — 87

| Avoid All Incidents | Avoid Selected Incidents |
|---|---|

- View the Detailed Information —88
- Select this Incident to Avoid

I-405 North Bound, Stall Big Rig

Fig. 11E

Traffic Incident List

| Avoid All Incidents | Avoid Selected Incidents |
|---|---|
| I-10 West Bound, Traffic Jam | |
| I-605 South Bound, Congestion | |
| CA-91 West Bound, Slow Traffic | |
| CA-91 West Bound, before I-710 Construction | |
| I-405 North Bound, Accidents | |
| I-405 North Bound, Stall Big Rig | |

NAVIGATION SYSTEM FOR FINDING OPTIMUM ROUTE USING TRAFFIC INCIDENTS INFORMATION

FIELD OF THE INVENTION

This invention relates to a display method and apparatus for a navigation system, and more particularly, to a display method and apparatus for receiving and displaying traffic incidents information in a manner easily and quickly comprehensible by a user and finding an optimum route to the destination while avoiding specified traffic incidents.

BACKGROUND OF THE INVENTION

Modern vehicles are equipped with sophisticated electronic devices such as multimedia entertainment systems, GPS navigation systems, internet access devices, and the like. This invention is directed to a display method and apparatus for displaying traffic information which is typically implemented in such a vehicle electronic device, although the present invention is not limited to the automobile use. This invention can also be applied to a hand-held navigation system, remote terminal, PDA (personal digital assistant), etc. However, for the convenience of explanation, the present invention will be described with respect to a vehicle navigation system.

When driving an automobile, a user wants to reach the destination quickly and smoothly. However, because of various traffic incidents, such as traffic jams, accidents, construction, etc., it is sometimes difficult to enjoy smooth driving to the destination. Thus, when driving an automobile to the destination guided by a vehicle navigation system, a user wants to know whether there are any traffic incidents that may affect his/her travel to the destination. If it is possible to know such a traffic incident and its degree of seriousness in advance, the user can change the route or spend a time at a convenient place to avoid the traffic incident.

Today, there is a radio service which provides traffic information to members through a wireless transmission or a telephone network. If a user is a member of such a service, the user is able to receive the ongoing traffic information through the vehicle navigation system, a portable navigation device, or the like, having a radio transmitter or an Internet access capability. For example, such traffic information (depicted by traffic incident icons) will be combined with a map image of an area where the user is currently located.

Especially, when receiving such information by the vehicle navigation system and displaying the traffic information on the navigation screen, it is important that the driver should not be distracted from the driving by paying attention to the display. To maintain the safe driving, it is necessary that the driver can easily and quickly grasp the important traffic information at a glance. In other words, the traffic information which will not affect the user's travel to the destination should not be treated in the same manner as the more important traffic information. Accordingly, there is a need of evaluating the traffic information in combination with the specific route to the destination particular to a user.

Thus, the user needs the traffic incident information only related to the route to the destination in order to select specific incidents to be avoided and to obtain a new guided route to the destination. Operations for selecting the incidents should be simple in order to maintain the safe driving. However, frequently, in a conventional navigation system, the user can not grasp enough information regarding the traffic incidents and can not easily select which incidents should be avoided on the route.

Therefore, in the navigation system, there is a need for more sophisticated display method and apparatus for displaying traffic information. There is a need of a new navigation system which enables the user to efficiently and easily grasp the traffic incidents information on the calculated route to the destination, select the traffic incidents to be avoided, and obtain a new optimum route to the destination which is not affected by the traffic incidents specified by the user.

SUMMARY OF THE INVENTION

It is, therefore, an object of the present invention to provide a display method and apparatus for a navigation system which is capable of displaying important traffic incidents related to a calculated route to a destination as well as all the traffic incidents in an area surrounding the calculated route.

It is another object of the present invention to provide a display method and apparatus for a navigation system which allows the user to select any traffic incidents information to receive detailed information on the selected traffic incidents such as video images and text data through a wireless communication.

It is a further object of the present invention to provide a display method and apparatus for a navigation system which allows the user to select which type of traffic incidents information, either on a map image or a traffic incident list, should be displayed on the navigation system.

It is a further object of the present invention to provide a display method and apparatus for a navigation system which allows the user to select which incidents should be avoided, either through the map image or the list of traffic incidents, thereby obtaining a new guided route to the destination.

The navigation system of the present invention is designed to enable a user to quickly observe the traffic information on the navigation screen to fully comprehend the important traffic information at a glance. To make the operation easier and quicker, the navigation system allows the user to select the traffic incidents to check more detailed information on the same map image. The navigation system of the present invention allows the user to select which incidents should be avoided and calculates a new route to the destination which is not affected by the selected traffic incidents.

More specifically, the display method of the present invention includes the steps of: receiving traffic information through a wireless communication device, identifying locations of all of traffic incidents in a coverage area which is dependent upon a current position of a user of the navigation system and a calculated route to a user's destination, selecting one of display types, all of the traffic incidents in the coverage area or a part of the traffic incidents on the calculated route to the destination, displaying the traffic incidents of the selected display type on the navigation system, selecting a traffic incident to be avoided on the calculated route to the destination, and calculating a new route to the destination which does not have the selected traffic incident and displaying the new calculated route to the destination.

In the display method of the present invention, preferably, the step of displaying the traffic incidents includes a step of displaying all of the traffic incidents in the coverage area on a map image or a part of the traffic incidents on the calculated route to the destination on the map image. Alternatively, the step of displaying the traffic incidents includes a step of displaying all of the traffic incidents in the coverage area in a traffic incident list or a part of the traffic incidents on the calculated route to the destination on the traffic incident list.

In the display method of the present invention, preferably, the step of selecting the traffic incident on the map image further includes a step of selecting one of the traffic incidents by pointing a cursor at a traffic incident icon. The step of selecting the traffic incident to avoid includes a step of automatically selecting all the traffic incidents on the calculated route to the destination.

In the display method of the present invention, further comprises a step of selecting a traffic incident to review detailed information on the traffic incident. The detailed traffic information includes text data and image data of the selected traffic incident received through the wireless communication. The display method further comprises a step of displaying a pop-up menu showing the detailed traffic information regarding the selected traffic incident after the traffic incident is selected by the user.

Another aspect of the present invention is a display apparatus for a navigation system configured by various means for achieving the display method described above. The display apparatus shows the traffic incidents related to the route to the destination or the coverage area and allows the user to select the traffic incidents to be avoided during the route to the destination.

According to the present invention, the navigation system is capable of displaying the traffic incidents in the manner that the user can grasp the traffic incidents quickly and easily by one or two short glances at the screen. The user can select the traffic incidents to review the detailed information which is downloaded though the wireless communication. Further, the user can select the traffic incidents to be avoided so that the travel to the destination is not affected by the selected traffic incident. The navigation system produces a new calculated route to the destination which does not include the traffic incidents specifically selected by the user. Accordingly, the user can travel to the destination comfortably and with confidence.

BRIEF DESCRIPTION OF THE DRAWINGS

FIGS. 3A–3F are schematic diagrams showing display examples of a navigation system. FIG. 3A shows a main menu, FIG. 3B shows a destination set menu, FIG. 3C shows a list of category when setting a point of interest, FIGS. 3D and 3E show name lists in the category specified in FIG. 3C, and FIG. 3F shows a key board for entering a street name of an address or intersection.

FIG. 8A shows a screen when the user selects "All Incidents in Area" in FIG. 7, and FIG. 8B shows a screen when the user chooses "Incidents on the Route" in FIG. 7.

FIG. 9 is a schematic diagram showing an example of a traffic incident list which shows traffic incidents only on the calculated route to the destination.

FIGS. 11A–11E are diagrams showing an example of process for selecting traffic incidents to view detailed information and/or to avoid the incidents where FIG. 11A shows an example of a traffic incident list, FIG. 11B shows an example of a pop-up menu, FIG. 11C shows an example of detailed information on the selected traffic incident, FIG. 11D shows an example of a pop-up menu on which "Avoid All Incidents" is selected, and FIG. 11E shows an example of the traffic incident list on which "Avoid Selected Incidents" is selected.

FIG. 12A shows an example of selecting traffic incidents to be avoided, and FIG. 12B shows an example of a new calculated route that has avoided the traffic incidents specified in FIG. 12A.

FIGS. 13A and 13B show an example of using a cursor to view the detailed traffic incidents information, and FIG. 13C shows an example of a new route that has avoided the traffic incidents specified by the user in FIGS. 13A and 13B.

DETAILED DESCRIPTION OF THE INVENTION

The display method and apparatus of the present invention will be described in more detail with reference to the accompanied drawings. While the present invention will be described in conjunction with the vehicle navigation system, it will be understood that the present invention is not limited to such a specific application. For example, the present invention can also be applicable to a portable (hand-held) navigation system, a portable data terminal such as a personal digital assistant (PDA), a lap top computer with a navigation function, and the like.

Figure 1A:
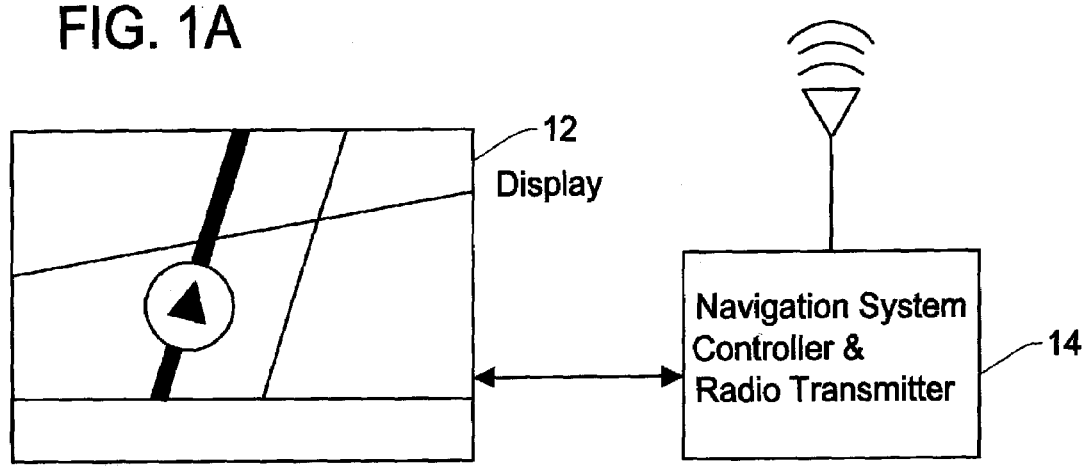
FIGS. 1A and 1B are schematic diagrams showing examples of basic configuration of a navigation system or the like equipped with a radio communication for receiving wireless information services in accordance with the present invention.
Figure 1B:
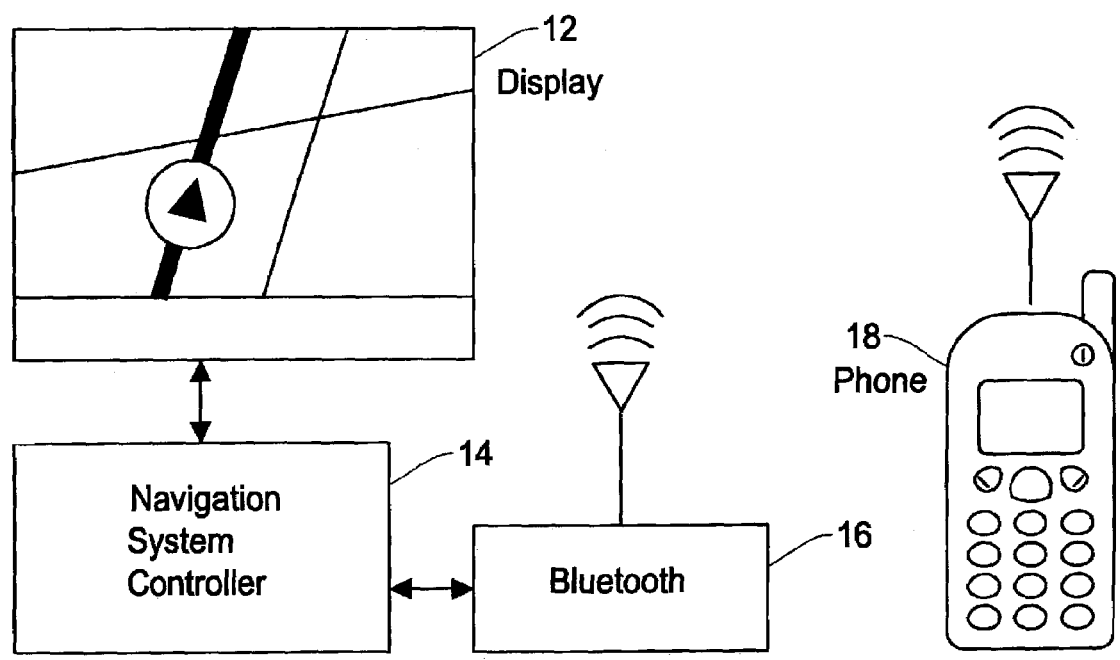

FIGS. 1A and 1B schematically show a basic structure of the navigation system of the present invention. In addition to the basic navigator function, the navigation system of the present invention includes a wireless transmission device for communication with a database server and a controller for processing the traffic information. Typically, the navigation system is a vehicle navigation system installed in a vehicle. An example of radio communication device includes a satellite radio transmitter, FM sub-carrier transmitter, a cellular phone, a Bluetooth transceiver or other radio communication method as an embedded or peripheral device.

FIG. 1A is an example of navigation system having a radio transmitter. The example of FIG. 1A shows a display 12 of the navigation system and a navigation system controller 14 with a radio transmitter. The radio transmitter receives various types of information from database servers (service providers) through wireless communication. There are various databases and transmission methods available at present or in the near future. An example of such database includes information on traffic, movie, sports, news, weather and the like.

FIG. 1B is an example of navigation system which incorporates a short distance radio transmitter such as a Bluetooth transceiver and a Bluetooth compatible cellular phone. The navigation system is formed of a display 12 of the navigation system, a navigation system controller 14, a short distance transmitter 16, and a cellular phone 18. An example of short distance transmitter 16 includes a Bluetooth transmitter (transceiver), an IEEE 802.11b wireless LAN transmitter and a HomeRF transmitter. The short distance wireless transmitter 16 is connected to the navigation system and communicates with the cellular phone 18 to establish long distance radio communication. The cellular phone 18 is designed to be compatible with the Bluetooth or other radio communication protocol noted above.

First, the basic technology involved in a navigation system is described here. Such a navigation system detects the position of a user such as a current vehicle position, reads out map data pertaining to an area at the vehicle current position from a data storage medium, for example, a CD-ROM (compact disk read-only memory), DVD (digital versatile disc), or a hard disc. The navigation system displays a map image on a monitor screen (display) while superposing a mark representing the current user position on a predetermined portion of the map image.

The most of the navigation systems today include map data storage and a CPU to perform the route guidance function in the user's side such as in a vehicle. However, it is also possible that the map data and the route guidance function are provided by a navigation server remote from the user so long as a current user position such as a vehicle position is known to the navigation server.

Typically, the current user position (e.g. current vehicle position) is determined by a combination of a self-contained navigation sensors (e.g. a distance traveled sensor and a bearing sensor) mounted in the vehicle and a global positioning system (GPS) including an artificial satellite (satellite navigation). As the present position of the user changes with the travel of the vehicle, the vehicle current position mark in the map image changes accordingly. Alternatively, the map is scrolled while the vehicle current position mark is fixed at a predetermined position, for example, at the center of the map image. In either of the methods, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided (calculated) route from the starting point to the destination. Typically, the route guidance function performs an intersection guidance process in which a monitor screen displays an enlarged intersection diagram and the direction in which the vehicle is to travel while displaying the guided route on a map image. When a destination is input, a CPU in the navigation system determines a most suitable route to the destination and successively stores nodes data (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction to turn at the intersection) is displayed to inform a driver of the desired one of roads or directions selectable at the intersection.

Figure 2A:
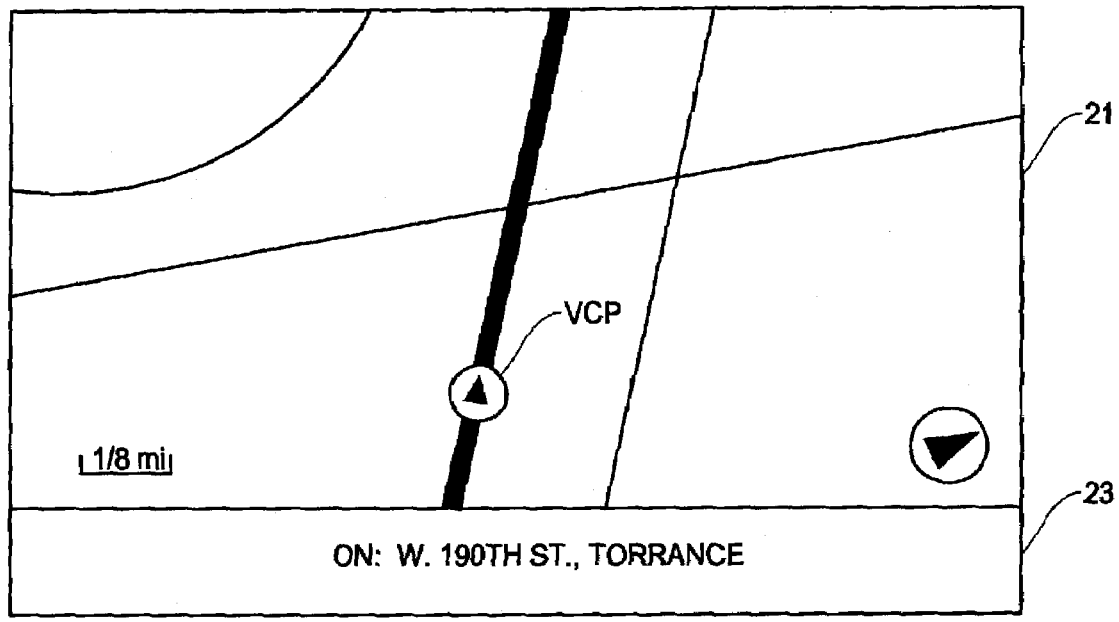
FIGS. 2A and 2B are schematic diagrams showing an example of locator map display and route guidance display, respectively, of a navigation system.

FIG. 2A shows an example of a locator map display containing a current vehicle position mark VP on a map image 21. Typically, a navigation system shows the street on which the vehicle is running in the map image 21 and a name of the street in an information box 23 on the monitor screen. Other information such as a north pointer NP, a map scale and a current time may also be illustrated on the display screen. The locator map display shows the current position of the vehicle on the map image, however, it does not perform the route guidance function because the destination is not set in the navigation system.

Figure 2B:
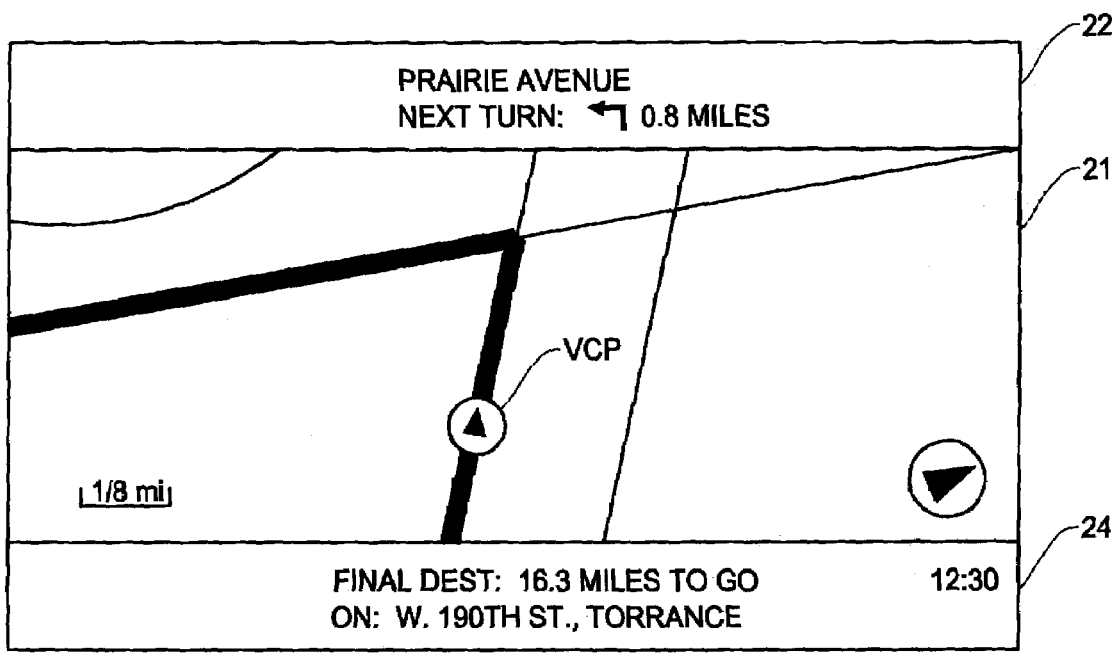

FIG. 2B shows an example of route guidance display which performs the route guidance function. The route guidance display is activated after specifying the destination. In this example, the current street "W 190TH ST" and the left side of the next street "PRAIRIE AVE" will be highlighted in the map image 21 to show the direction of turn at the next intersection. In addition, this example further shows an arrow indicating the direction (left) in which the vehicle is to turn at the intersection in a guidance information box 22 at the top of the screen. The guidance information box 22 also shows the name of the street which intersects with the current street and a distance to the intersection.

Further to the highlighted display, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 2B, a destination must be specified in the navigation system so that the system can find one or more routes to reach the destination. FIGS. 3A–3F show examples of display on the monitor screen during the operation of inputting the destination.

By operating a menu key, a main menu 25 such as shown in FIG. 3A is displayed on the navigation system and a menu item "Destination" is selected from the main menu. This allows the navigation system to display an "Enter Destination by" menu 27 as shown in FIG. 3B for specifying an input method for selecting the destination. The "Enter Destination by" menu 27 lists various methods for selecting the destination including "Address" for specifying the city and address of the destination, "Intersection" for specifying the names of two streets in the city which intersect with one another, and "Point of Interest" for selecting the programmed destination based on the name, category or telephone number.

Other methods in the "Enter Destination by" menu 27 include "Recent Route" for specifying the destination based on the recent destinations saved in the navigation system, "Address Book" for selecting the address of the destination out of the addresses stored in the system, and "Map Cursor" for specifying the destination by pointing a cursor to the destination on the map. For example, the information in the address book is formed of a list of names and addresses of the places that the user frequently visits.

Figure 3D:
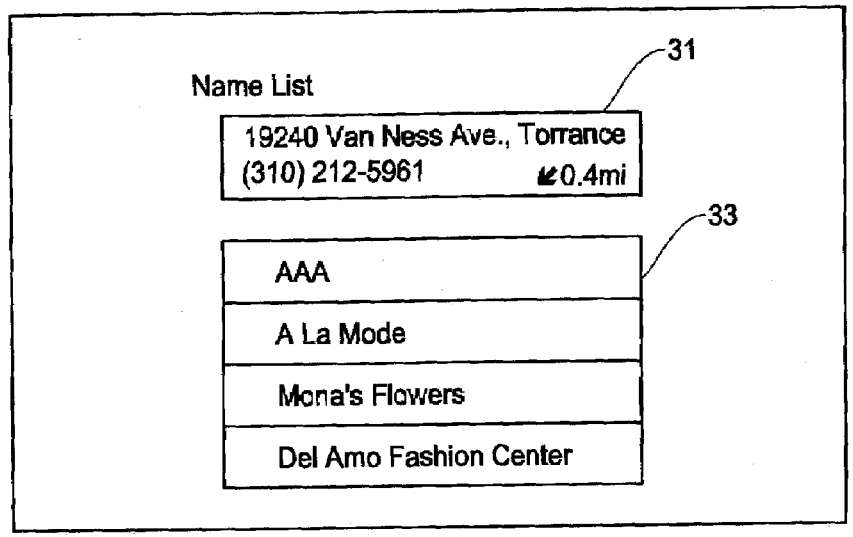
Figure 3E:
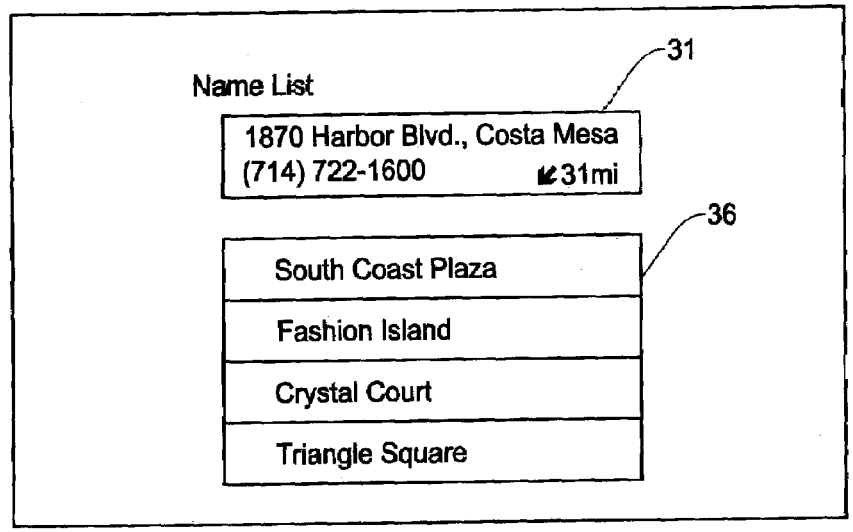
Figure 3F:
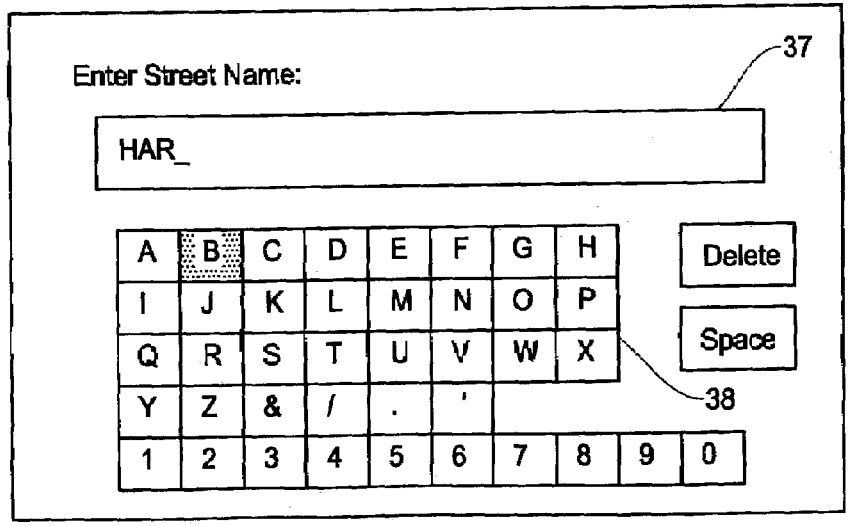

When selecting, for example, the "Point of Interest" in FIG. 3B, the navigation system displays a "Category List" menu 28 such as shown in FIG. 3C. The "Category List" menu 28 contains various different categories such as "Bank", "Restaurant", "Hotel", "Shopping" and others. Supposing the category of "Shopping" is selected, the navigation system displays "Name List" such as shown in FIGS. 3D and 3E. The "Name List" shows names of shops and shopping malls sorted by, for example, distance from the vehicle position. In an address information box 31 on the display, the address and phone number of the highlighted name in the list 33 will be displayed. The address information box 31 may also show the distance to the highlighted shop. Typically, the navigation system stores several tens or hundreds of names of shops within predetermined distances and displays several shops per page of display screen, and a user may scroll the display screen to see other names of the shops in the name list 36 such as shown in FIG. 3E.

When the destination is not prestored in the navigation system, a user can input the destination by selecting, for example, the "Address" method or "Intersection" method in the "Enter Destination by" menu 27 of FIG. 3B. Then, the navigation system displays an "Enter Street Name" shown in FIG. 3F for inputting the city and address in an address input box 37 by means of a key board (keypad) 38 displayed on the monitor screen.

After entering the destination, the navigation system determines a route to the destination based on, for example, the shortest way to reach the destination, the route using many free ways as possible or the route without using toll road, and the like. Thus, the navigation system moves to the route guidance display such as shown in FIG. 2B which performs the route guidance.

Figure 4:
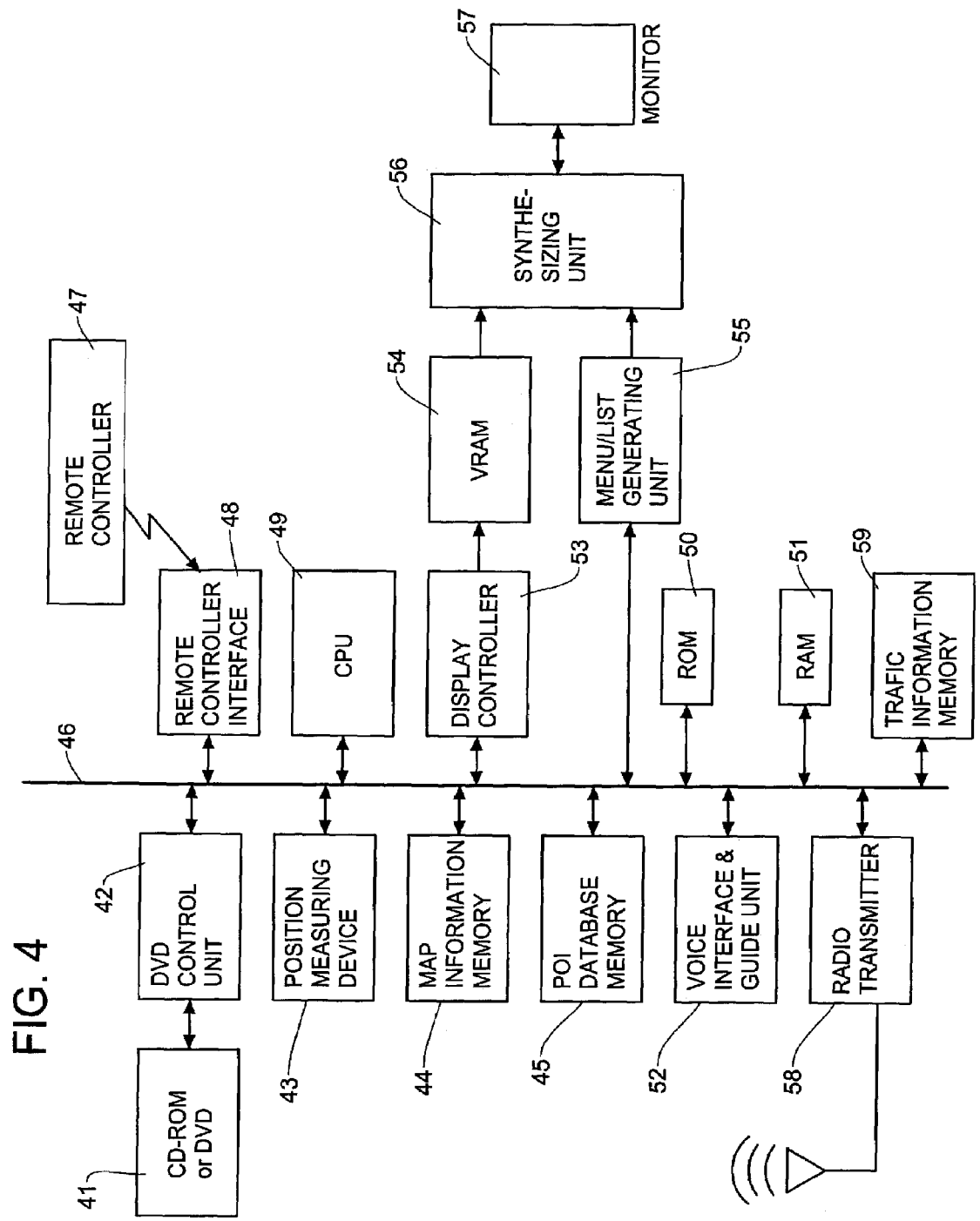
FIG. 4 is a block diagram showing an example of structure in the vehicle navigation system according to the present invention.

FIG. 4 is a block diagram showing a structure of a vehicle navigation system. The navigation system includes a map storage medium 41 such as a CD-ROM, DVD, hard disc or other storage means (hereafter "DVD") for storing map information, a DVD control unit 42 for controlling an operation for reading the map information from the DVD, a position measuring device 43 for measuring the present vehicle position. The position measuring device 43 has a vehicle speed sensor for detecting a moving distance, a gyro for detecting a moving direction, a microprocessor for calculating a position, a GPS receiver, and etc.

The block diagram of FIG. 4 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

Figure 5A:
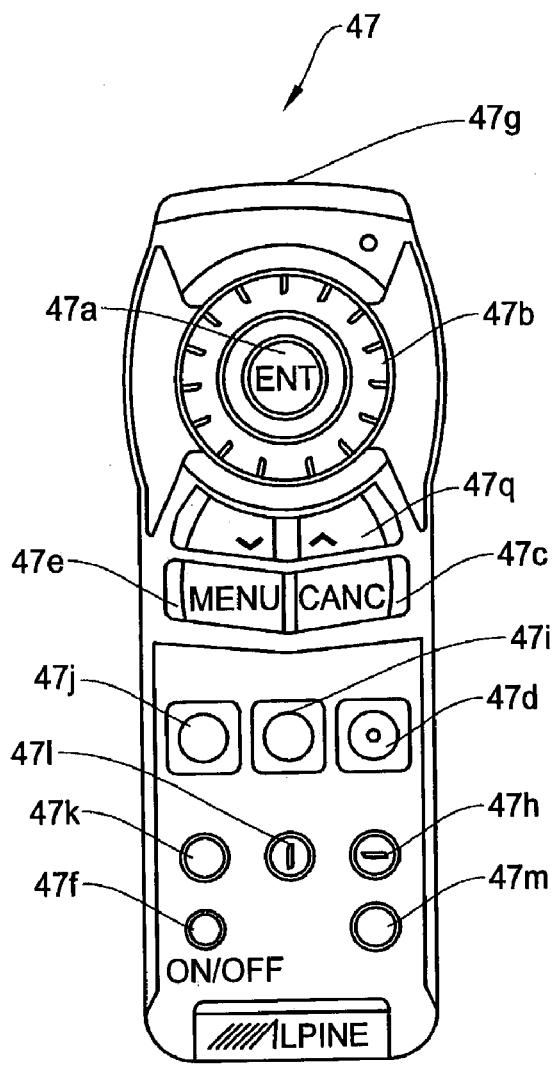
FIG. 5A and 5B are diagrams showing an example of a remote controller accompanied by the navigation system of the present invention.
Figure 5B:
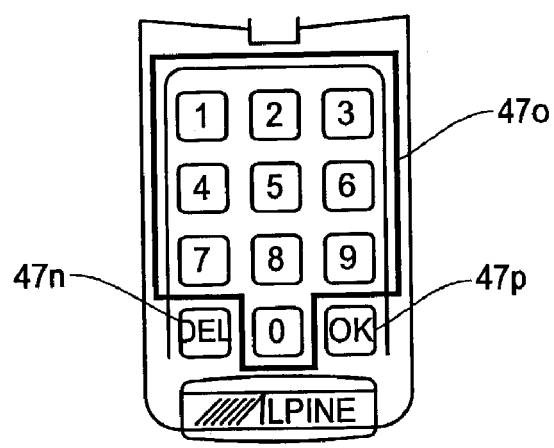

The remote controller 47 has a variety of function keys as shown in FIG. 5A and numeric keys as shown in FIG. 5B. The numeric keys appear when a lid in the lower part of FIG. 4A is opened. The remote controller 47 includes a joystick/enter key 47a, a rotary encoder 47b, a cancel key 47c, an MP/RG key 47d, a menu key 47e, a monitor ON/OFF key 47f, a remote control transmitter 47g, a plan key 47h, an N/H key 47i, a voice key 47j, a list key 47k, a detour key 47l, a delete destination key 47m, a delete key 47n, numeric keys 47o, an OK key 47p, and a zoom/scroll key 47q.

The joystick/enter key 47a selects highlighted items within the menu and moves map displays and a vehicle position icon or a cursor. The rotary encoder 47b changes zoom scale, scrolls list pages, moves the cursor, and etc. The cancel key 47c cancels the present displayed screen or is operated when returning the screen to the previous menu screen. The MP/RG key 47d toggles between detailed map display and basic guide display during guidance. The menu key 47e displays the main menu. The plan key 47h deletes the route set by Today's Plan function, the N/H key 47i changes between North-up and Heading-up orientation, and the voice key 47j initiates voice instruction.

Although a remote controller such as described above is a typical example for selecting menus, executing selected functions and etc., the navigation system includes various other input methods to achieve the same and similar operations done through the remote controller. For example, the navigation system includes hard keys and joystick on a head unit of the system mounted on a dash board, touch screen, and voice communication means.

Referring back to FIG. 4, the navigation system further includes a bus 46 for interfacing the above units in the system, a processor (CPU) 49 for controlling an overall operation of the navigation system including the traffic information processing in the present invention, a ROM 50 for storing various control programs such as a route search program and a map matching program necessary for navigation control, a RAM 51 for storing a processing result such as a guide route, a voice guiding unit 52 for guiding a traveling direction at a crossroad with spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, and a monitor (display) 57.

The navigation system further includes a radio transmitter 58 for wireless communication with a database service provider, and a traffic information memory 59 for storing the traffic information from the service provider. The radio transmitter 58 corresponds to the radio transmitters 14 and 16 in FIGS. 1A and 1B. The radio transmitter 58 is typically a long-range wireless transceiver such as a satellite transceiver, FM sub-carrier transmitter or a short-range wireless transmitter such as a Bluetooth transceiver, or other wireless transmitter. The radio transmitter 58 receives traffic data from a service provider or other event data from corresponding service providers through wireless data transmission.

Figure 6A:
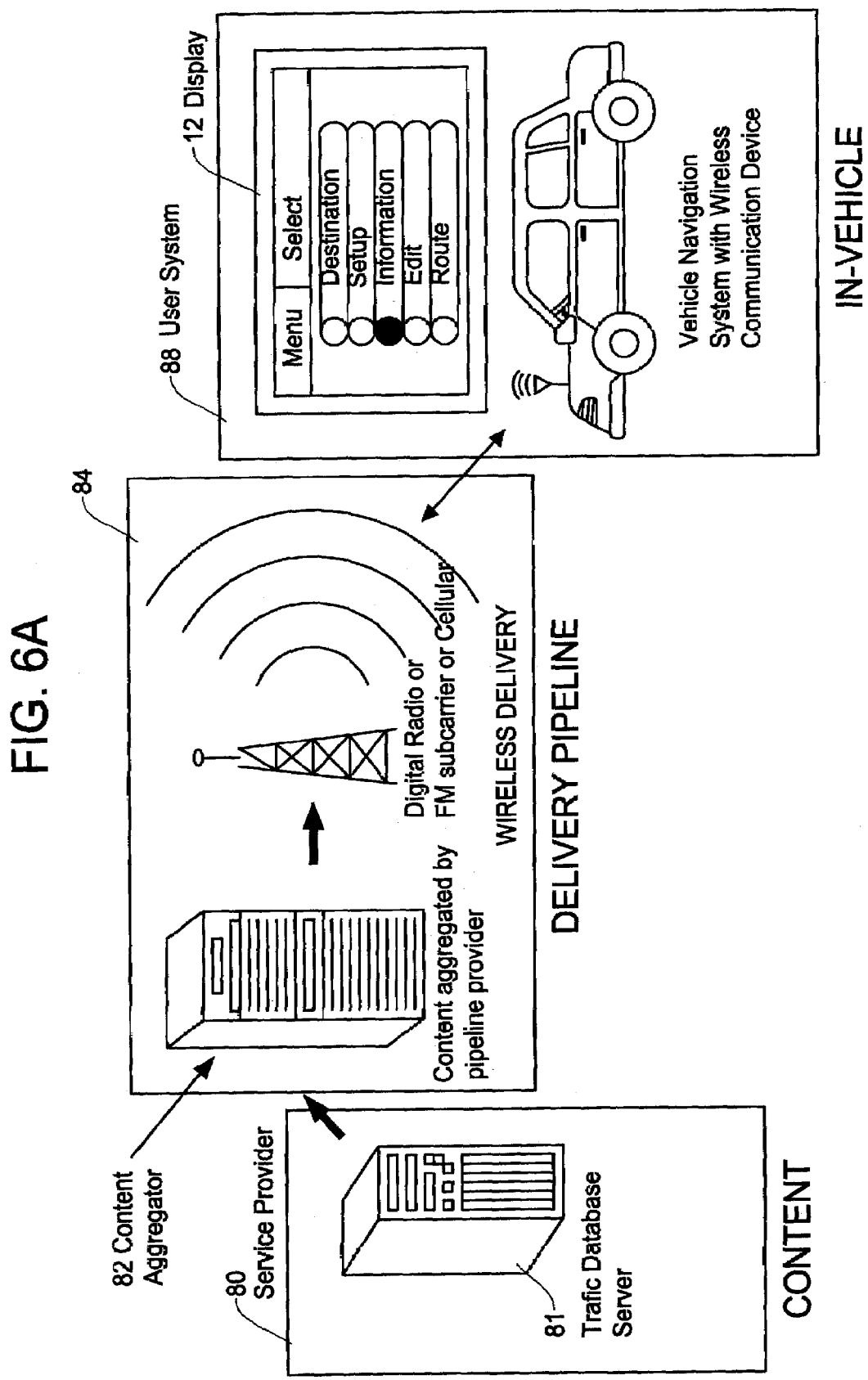
FIG. 6A is a schematic diagram showing an example of overall system involving a traffic information service provider, the navigation system, and information delivery infrastructures.

An overall system associated with the present invention for receiving and processing the traffic information is shown in FIG. 6A. In this example, the overall system includes a user system 88, typically a vehicle navigation system described above installed in a vehicle. The overall system further includes a service provider 80 such as a traffic database server 81 and a content aggregator 82, and data delivery infrastructures (delivery pipeline) in a form of wireless delivery 84.

The traffic database server 81 may be one of many other types of database. An example of other types of database include movies, sports games, dramas, TV programs, races, news, shopping information, and weather forecast. Typically, such databases are aggregated to the content server or content aggregator 82.

An example of the wireless delivery 84 is a radio data transmission network. Various radio transmission methods are used in the wireless delivery 84, for example, radio satellite transmission, FM sub-carrier transmissions AM radio transmission (digital radio) and the like. The FM sub-carrier transmission and AM radio transmission may also be used to Internet applications for automobile and hand held devices.

By selecting an "Information" menu, for example, in the main menu screen of the navigation system display 12, the user system 88 starts communication with the traffic database server 81. The user system 88 receives the traffic information through the wireless delivery 84 and the radio transmitter 58 (FIG. 4). The navigation system processes the traffic data in combination with the position data and the calculated route data to display the traffic incidents in accordance with the present invention.

Figure 6B:
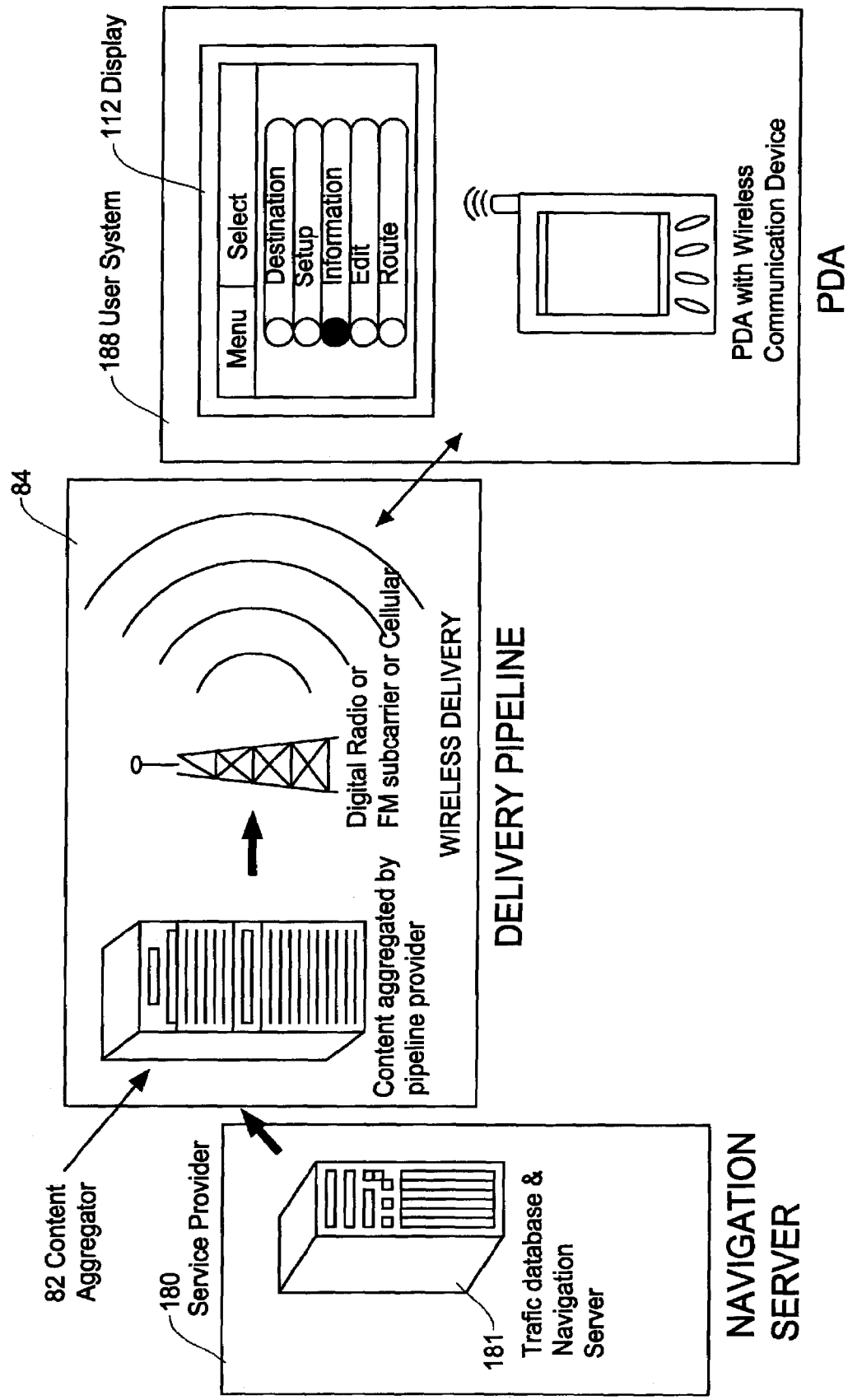
FIG. 6B is a schematic diagram showing another example of overall system involving the service provider, a portable data terminal and information delivery infrastructures.

FIG. 6B shows another example of the overall system associated with the present invention for receiving and processing the traffic information. This example shows a system suitable for a user having a user system 188 with a relatively small terminal device such as a PDA (personal digital assistant) without a map data storage (DVD) or a high power computer. The PDA has a capability of detecting its position by, for example, a global positioning system (GPS) using artificial satellites.

A service provider 180 has a traffic database and navigation server 181 for performing a navigation function for the user as well as providing traffic information to the user. The traffic database and navigation server 181 has a map data storage and a high power computer to produce map image data or data lists of various types of destination based on the position information from the user. The traffic database and navigation server 181 calculates the route to the destination and guides the user to the destination. In other words, the traffic database and navigation server 181 includes all of the functions of the navigation system.

The PDA receives the navigation data from the traffic database and navigation server 181 through the wireless communication. When the user selects an "Information" menu, for example, on the PDA display 112, the traffic database and navigation server 181 sends the traffic information in combination with the map data and guided route data to the user. Accordingly, the PDA displays the map image with the calculated route and traffic incidents in accordance with the present invention.

Figure 7:
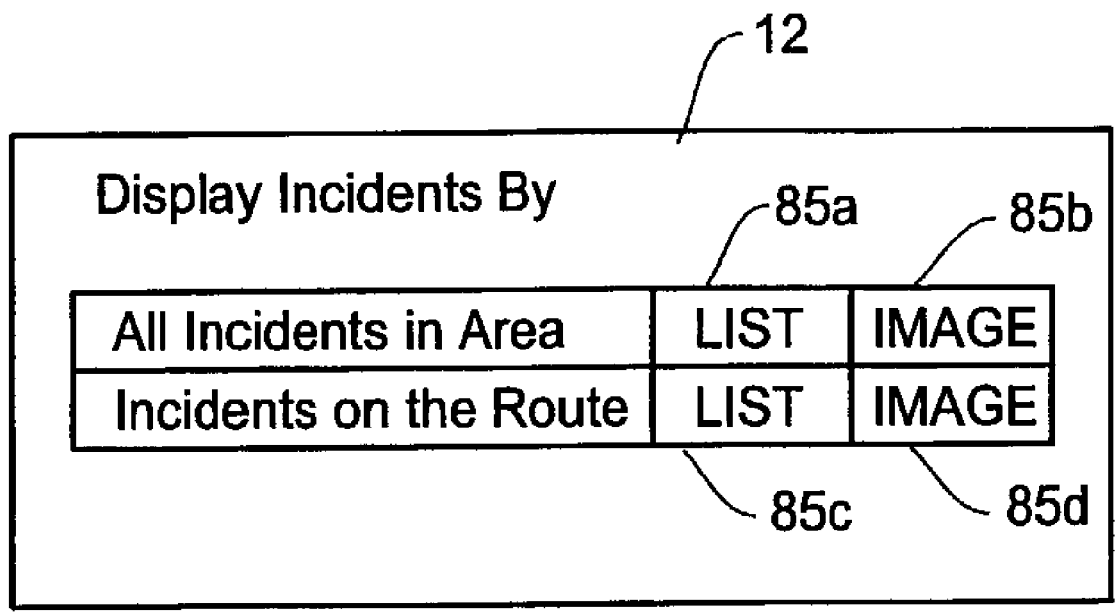
FIG. 7 is a schematic diagram of a display example of the navigation system showing a list for selecting a display type of traffic incidents.

After selecting "Information" in FIGS. 6A or 6B, an example of a menu for selecting display types appears as shown in FIG. 7. The user can select one of the following four types of menu: a incident list (85a) including all of traffic incidents in the area, a map image (85b) including all of traffic incidents in the area, a incident list (85c) including only traffic incidents on the calculated route to the destination, and a map image (85d) including only the traffic incidents on the calculated route.

For example, if the user wants to displays only the traffic incidents on the calculated route on the map image, the menu "Image 85d" in the "Incidents on the Route" should be selected. Also, if the user wants to display all the incidents on the list, the menu "List 85a" in the "All Incidents in Area" should be selected. In this manner, the user can select one of the four display types through the process of FIG. 7.

Figure 8A:
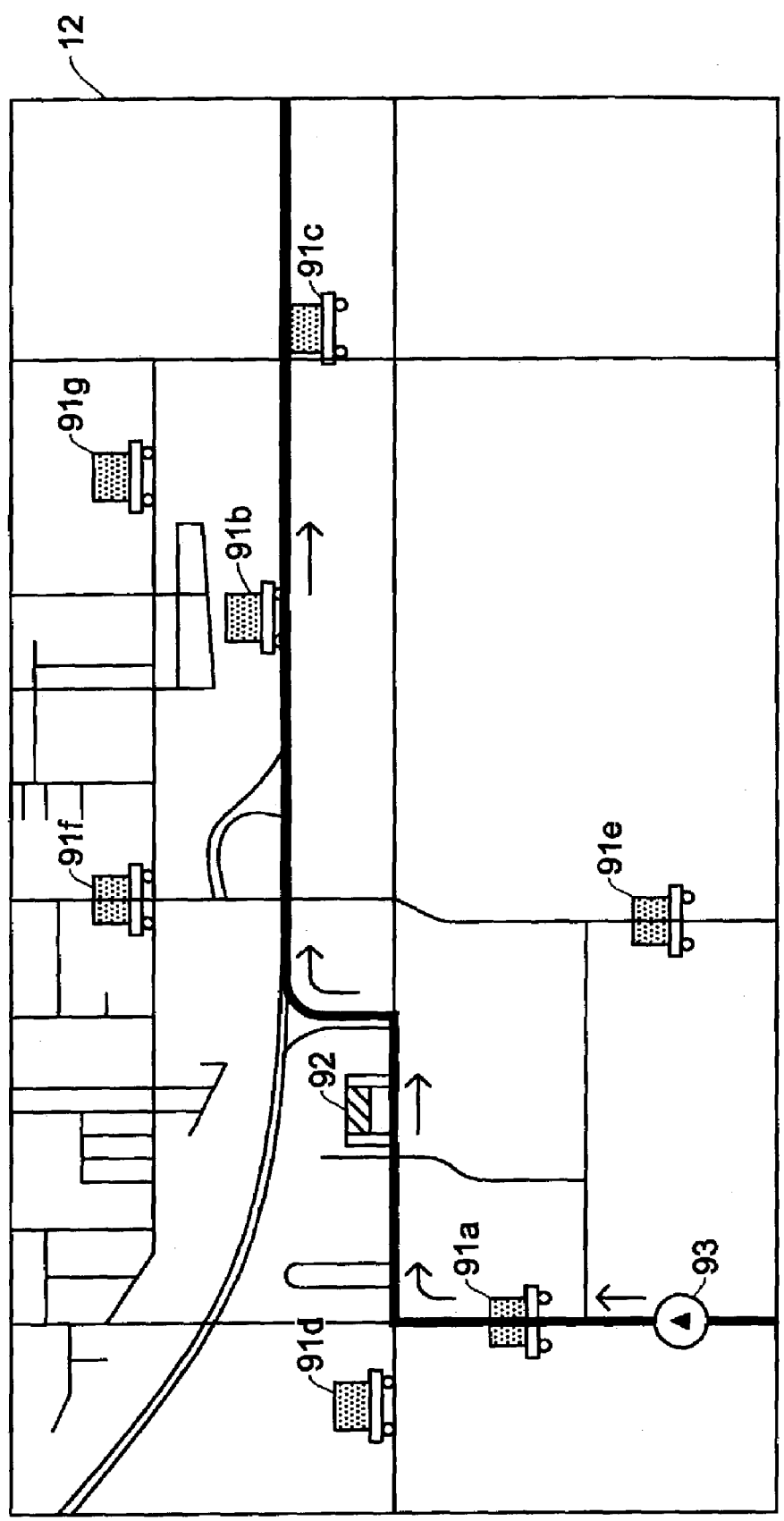
FIGS. 8A and 8B are display examples of the navigation system where

FIG. 8A is an example of a map image on the screen 12 of the navigation system when the user selects the "Image 85b" menu in FIG. 7. Thus, the navigation system displays all the traffic incidents in the covered area on the map image. A position mark 93 indicates the current vehicle position (current user position) on the map image. The bold line with arrows indicates the calculated route to the destination. Icons 91a, 91b, 91c and 92 indicate the traffic incidents on the calculated route, and icons 91d, 91e, 91f and 91g show the traffic incidents away from the calculated route. Each icon means a type of traffic incident. For example, the icons, 91a, 91b, 91c and 91d mean "Traffic jam", "Congestion", "Accidents" and "Stall" respectively, and the icon 92 means "Construction".

Figure 8B:
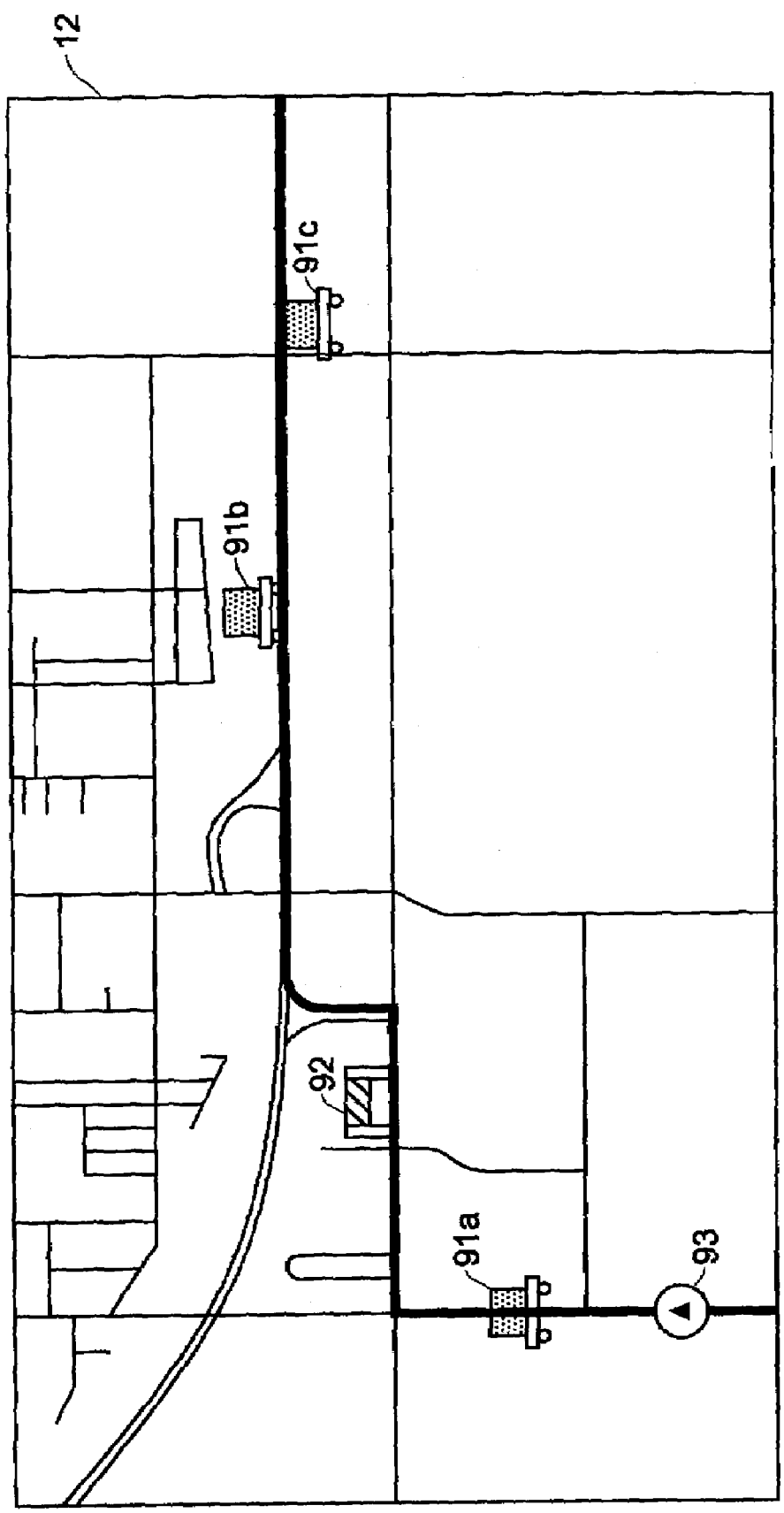

FIG. 8B shows an example of a map image on the screen 12 of the navigation system when the user selects the "Image 85d" menu in the selection screen of FIG. 7. As shown in the drawings, only the traffic incident icons (91a, 91b and 91c) on the calculated route are displayed. Accordingly, the user can easily recognize the incidents which should be considered first. The bold line indicates the route to the destination calculated by the navigation system.

If the user wants to view the list including the incidents only on the calculated route and selects the "List 85c" menu in the column, then the navigation system displays a traffic incident list 87 shown in FIG. 9. In this example, each traffic incident in the list 87 includes the icon and a short message such as "I-10 West Bound, Traffic Jam". The list further includes a menu to select whether all of the traffic incidents or a part of the traffic incidents on the calculated route should be avoided.

Figure 10:
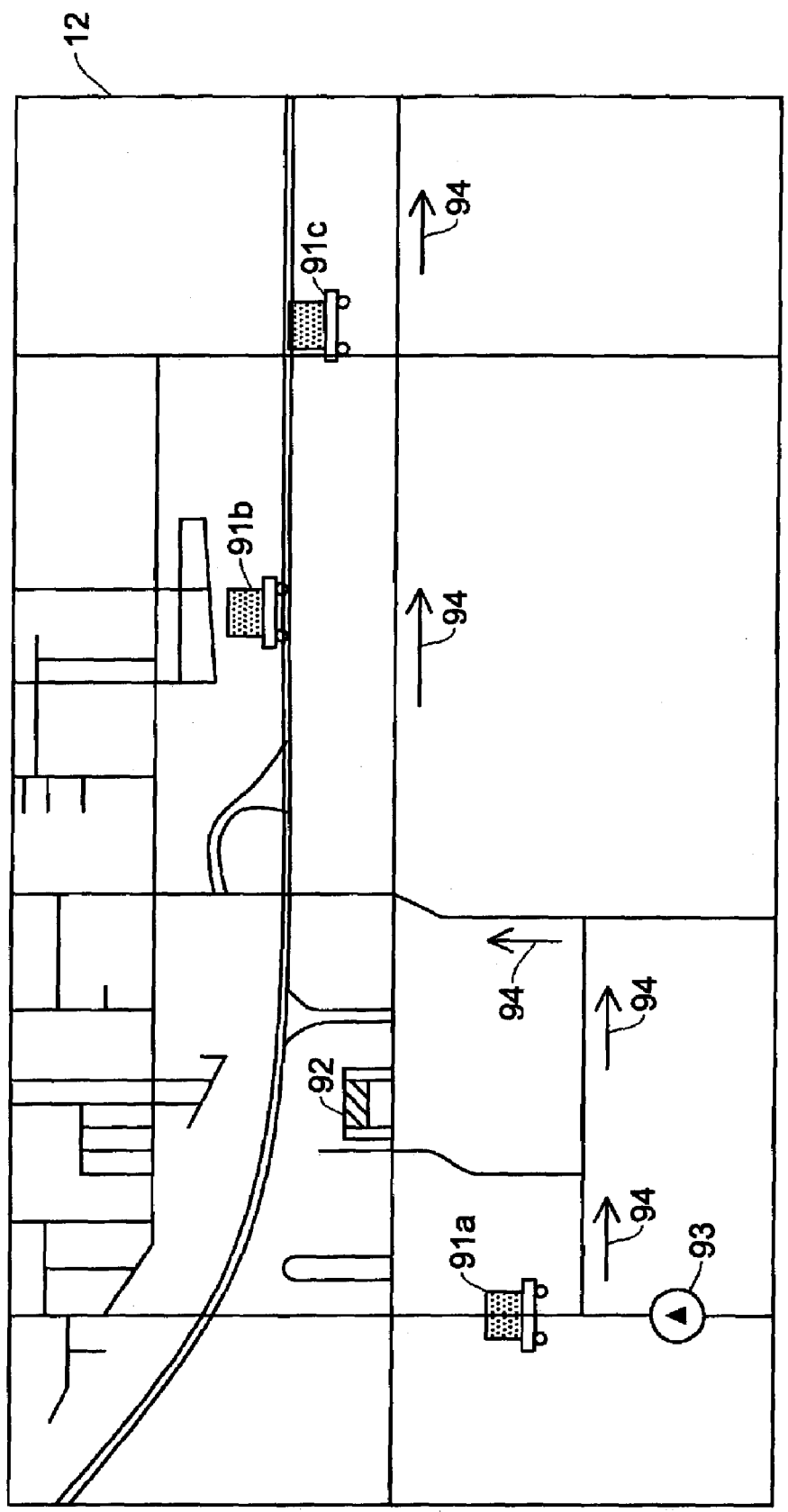
FIG. 10 is a schematic diagram showing a new route to the destination in the case where the user selects all the traffic incidents on the calculated route to avoid.

Accordingly, if the user wants to avoid all the traffic incidents on the route to the destination, then the user selects the "Avoid All Incidents" menu. As noted above, the user can select the menu by operating the joystick/enter key 47a of the remote controller 47 in FIG. 5A or other means such as touching the screen. Then, the navigation system calculates a new route which avoids all the incidents on the previous route and displays the new calculated route as shown in FIG. 10. In this example, the new route is accompanied by arrows 94. Accordingly, the user will be guided through the new route to the destination.

As noted above, a short message is provided for each traffic incident in the traffic incident list 87 shown in FIG. 9. However, if the user wants to know more detailed information regarding the incidents, the user can request the detailed information by selecting the incidents on the list. For example, in the case where the user wants to know more about the traffic incident "I-10 West Bound, Traffic Jam" in the list, the user may select the incident by highlighting it as shown in FIG. 11A.

Then, a pop-up menu 88 will appear as shown in FIG. 11B. The pop-up menu 88 in this example includes "View the Detailed Information" and "Select this Incidents to Avoid" menus, although many other combinations will be possible. Alternatively, the navigation system displays the detailed information directly without showing the pop-up menu 88. In FIG. 11B, since the user wants to view the detailed information, the user selects the "View the Detailed Information" menu in the pop-up menu 88.

Figure 11C:
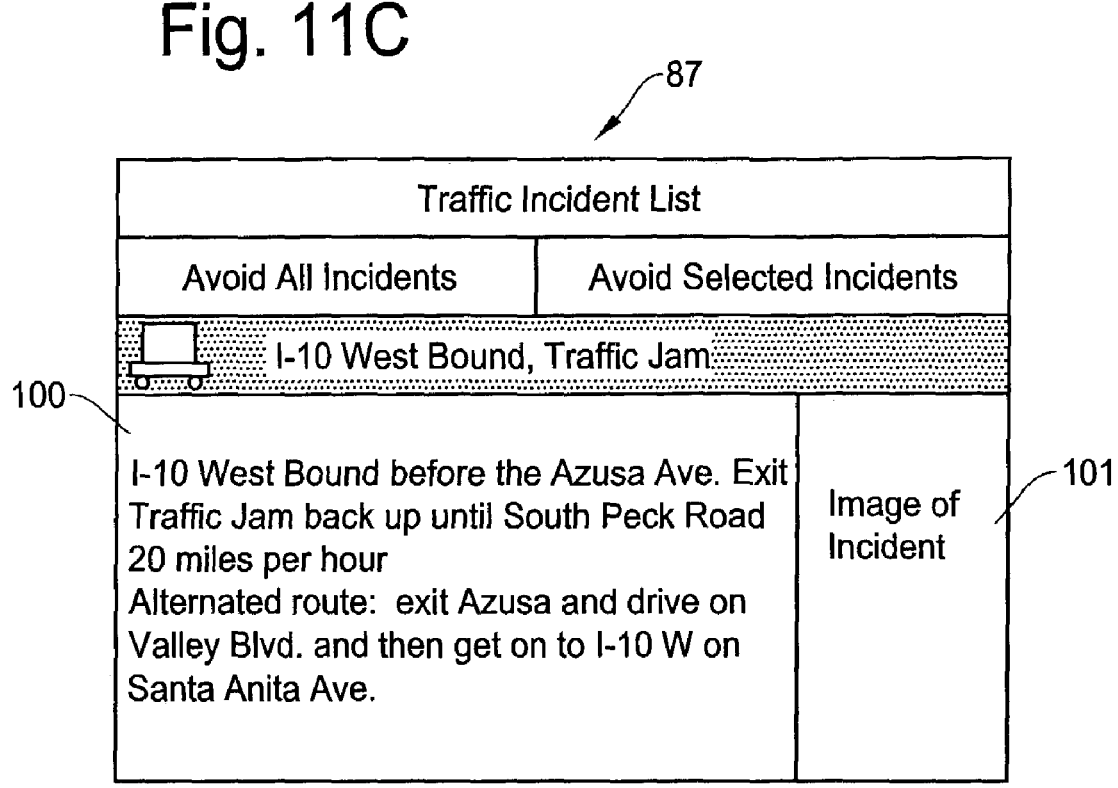

An example of the detailed information on the selected traffic incident is shown in FIG. 11C. In this example, the detailed information includes two types of information: text data (text information) 100 and image data 101 (only image area is shown for simplicity). The text data 100 and the image data (live image of the traffic incident) 101 may be usually downloaded through the wireless communication device. The downloading of the detailed information can be made when the user requested the detailed information, or when receiving the traffic incidents data at first, or anytime when the CPU 49 (in FIG. 4) is available to access the service provider.

The downloaded information is stored in the traffic information memory 59 shown in FIG. 4 and is displayed when it is requested in the process above. Such detailed information can be displayed on the traffic incident list of FIG. 11C above or on the map image of FIG. 13A. The text information 100 includes detailed information on the selected traffic incident such as a type or cause of the incident, traffic length affected by the incident, traffic speed, and estimate clearance time of the incident. Further, the user can see the live image of the incident such as an actual vehicle accident through the image data 101. In general, the image can help the user to understand actual conditions of the incidents, thus the user can easily decide as to which traffic incident should be avoided.

Figure 11D:
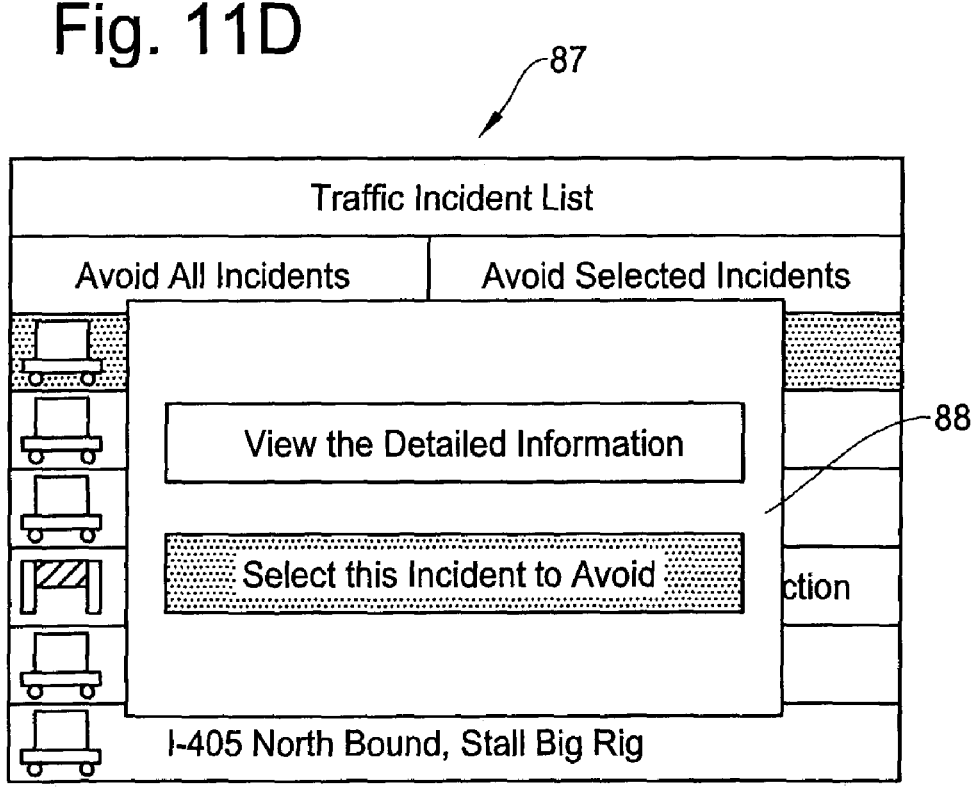

After reviewing the detailed information, if the user wants to avoid the traffic incident, the user enters the "Select this Incident to Avoid" menu in the pop-up menu 88 in FIG. 11D. Accordingly, the user can specify the traffic incident to be avoided during the trip to the destination. To go back to the traffic incident list, the user operates the cancel key 47c on the remote controller 47. Thus, by repeating the above procedure described with reference to FIGS. 11A–11D, the user can check the detailed information on all of the traffic incidents on the route to the destination and select the traffic incidents to be avoided on the route to the destination.

After reviewing all the incidents, the user selects the "Avoid Selected Incidents" menu in the process shown in FIG. 11E. Alternatively, the user can simply select the traffic incidents to be avoided without reviewing the detailed information of the incidents. Then, a new route which does not have the traffic incidents specified by the user is calculated by the navigation system. Accordingly, the new calculated route to the destination will be displayed on the map image on the screen 12.

Figure 12A:
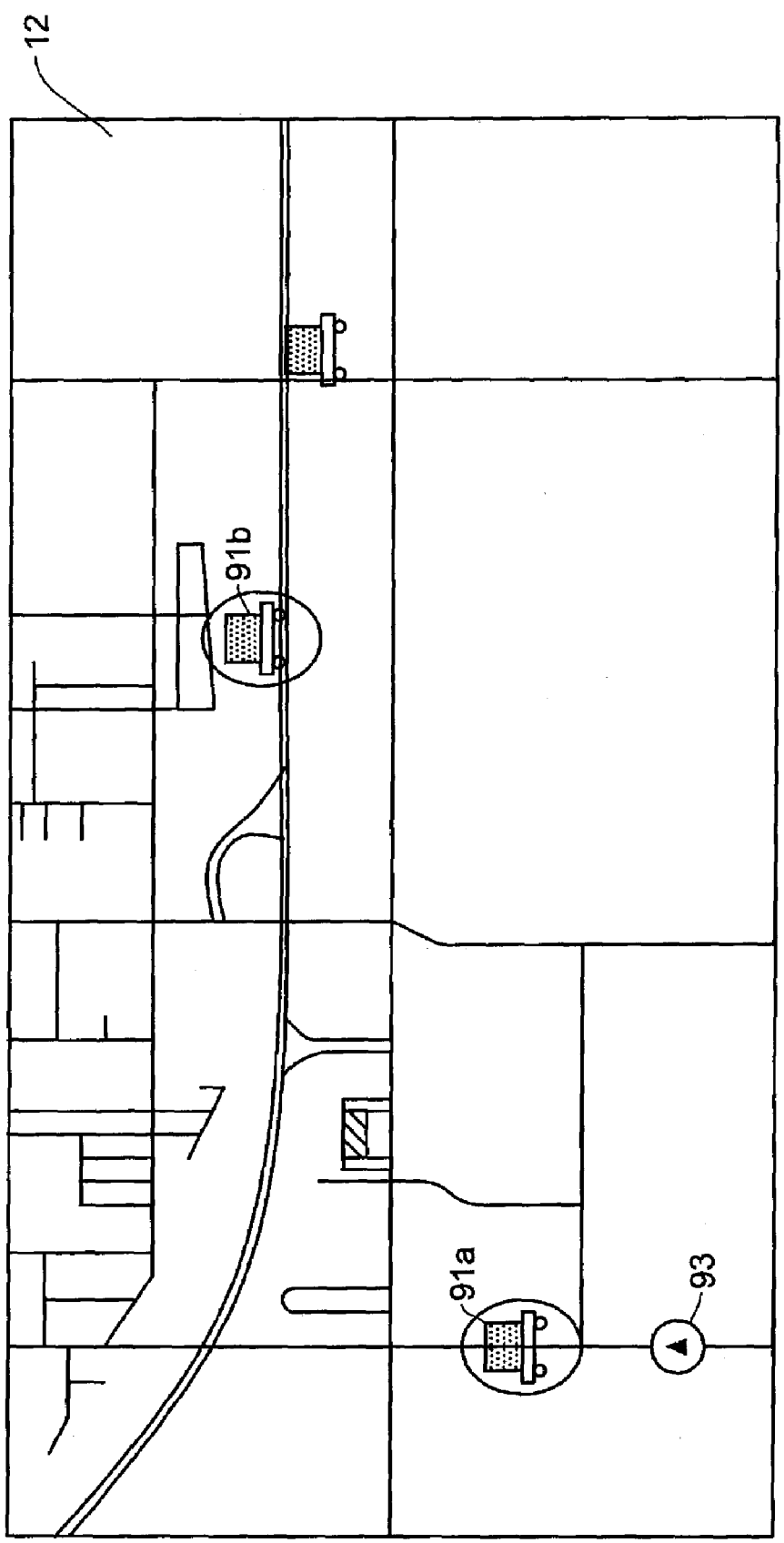
FIGS. 12A and 12B are diagrams showing further display examples where
Figure 12B:
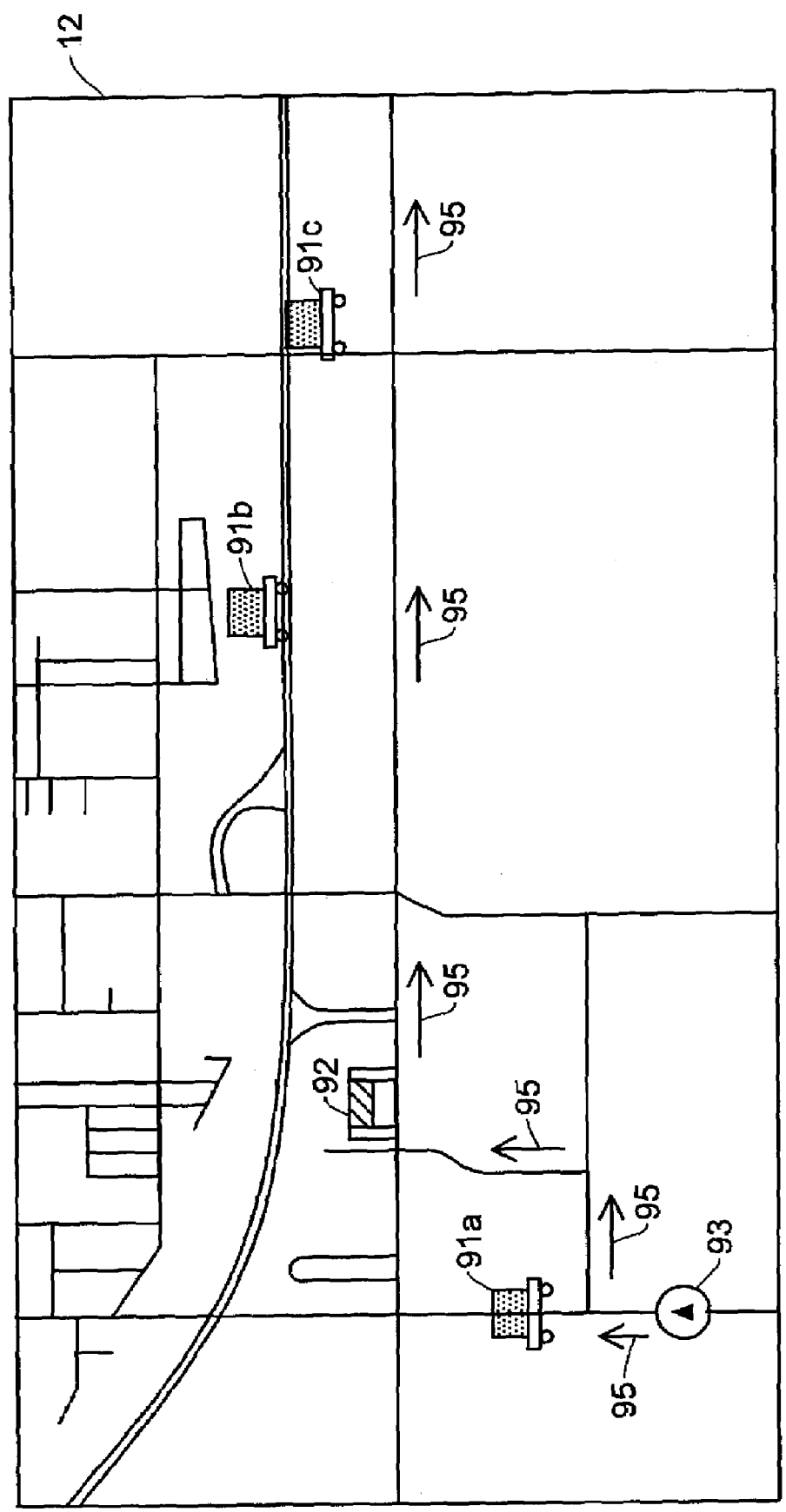

FIG. 12A shows a case where the two incidents 91a and 91b are specified by the user to be avoided on the route. The traffic incidents to be avoided can be specified from the traffic incident list as described above or from the map image with use of the cursor as will be described below. By selecting the "Avoid Selected Incidents" in FIG. 11E, a new route 95 with arrows is calculated and displayed as shown in FIG. 12B. Accordingly, the new calculated route is not affected by the traffic incidents specified by the user during the trip to the destination.

In the foregoing example, the user selects the traffic incidents to be avoided based on the traffic incidents list of FIG. 9. In the present invention, the user can select the traffic incidents by pointing the icons (91a–91g or 92) in FIGS. 8A–8B on the map image in order to review the detailed information or to select the incidents to be avoided. This process makes the selection of the traffic incidents easier than the method of using the traffic incident list described above.

Figure 13A:
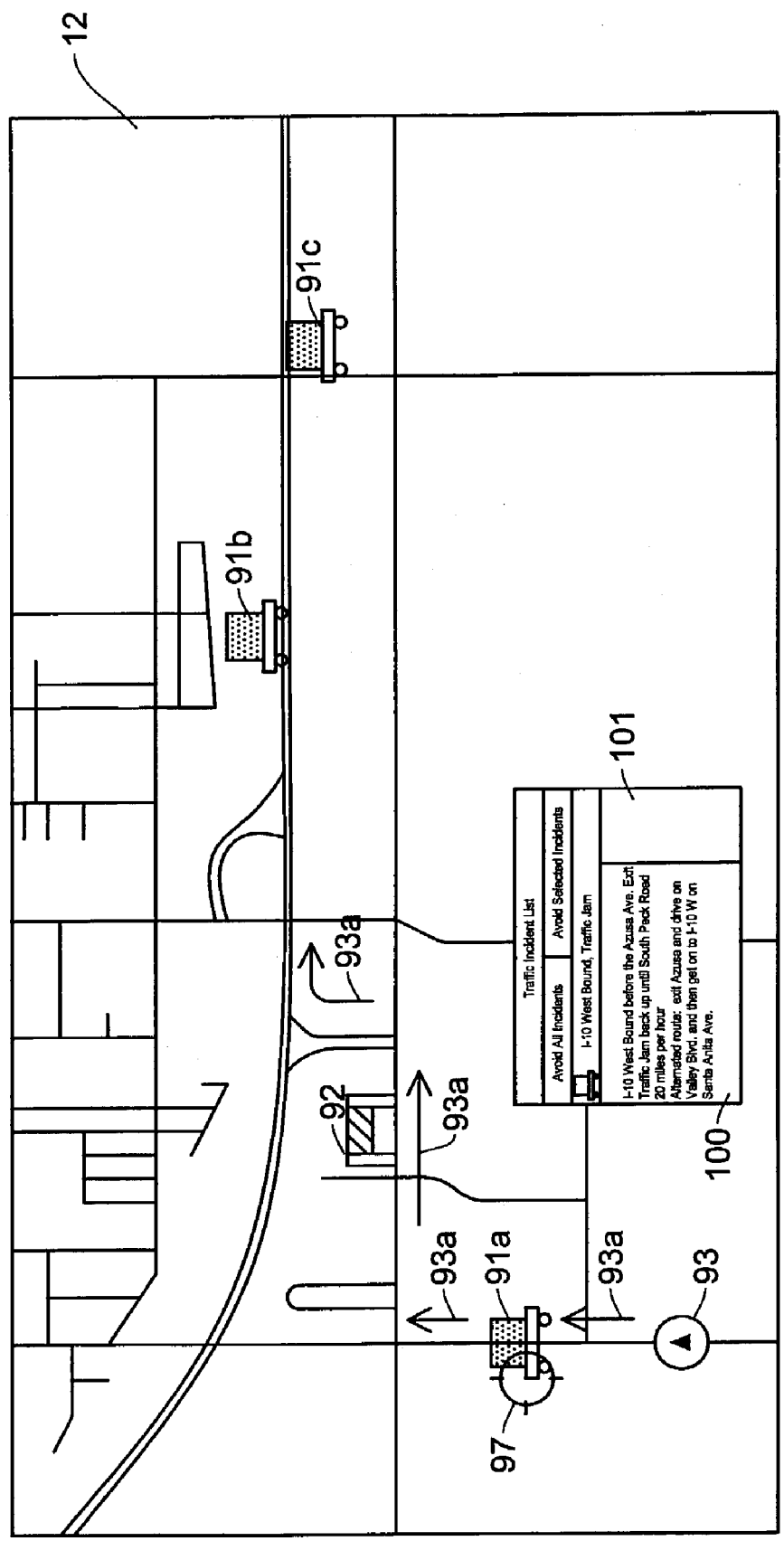
FIGS. 13A–13C are diagrams showing display examples of the navigation system where
Figure 13B:
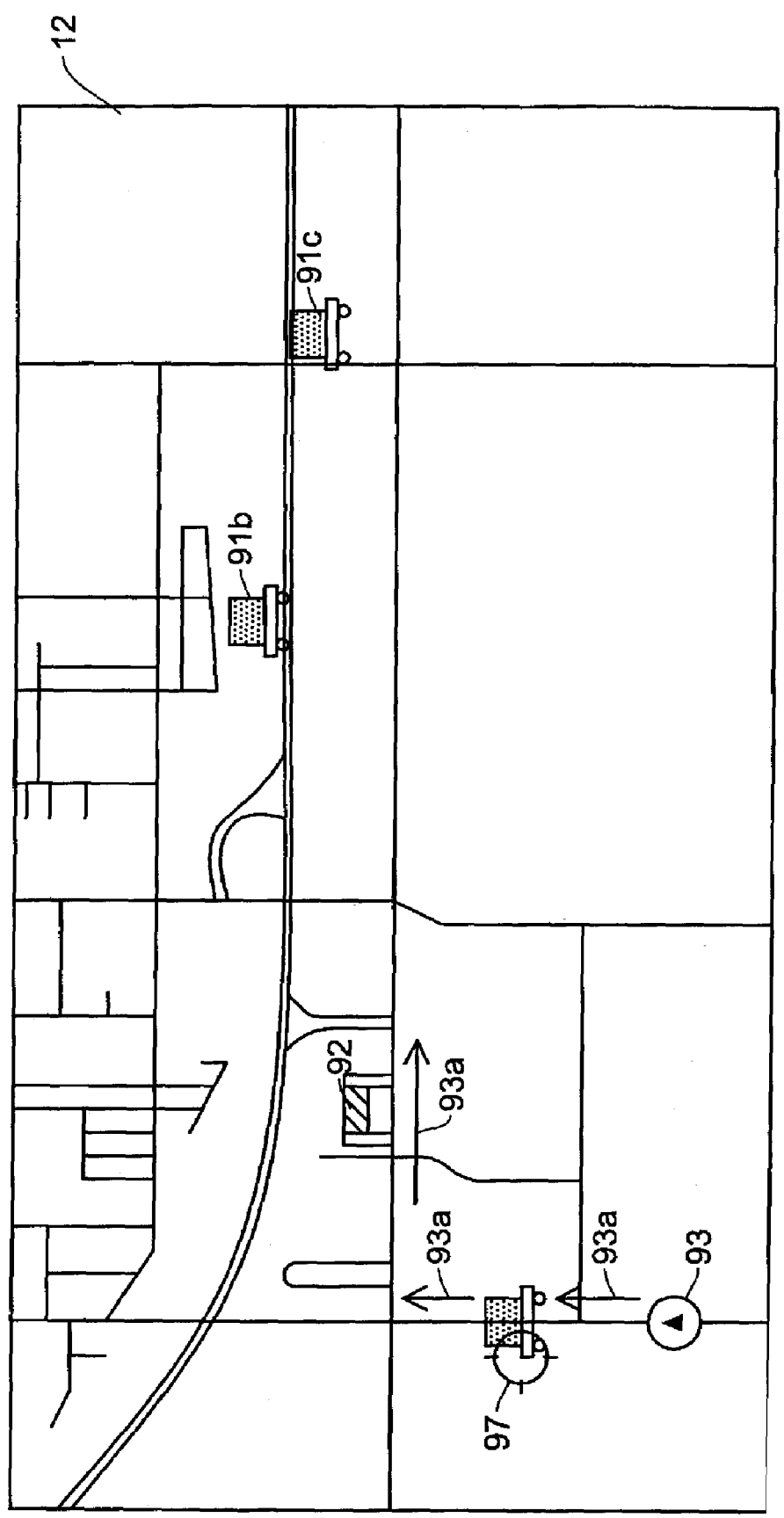
Figure 13C:
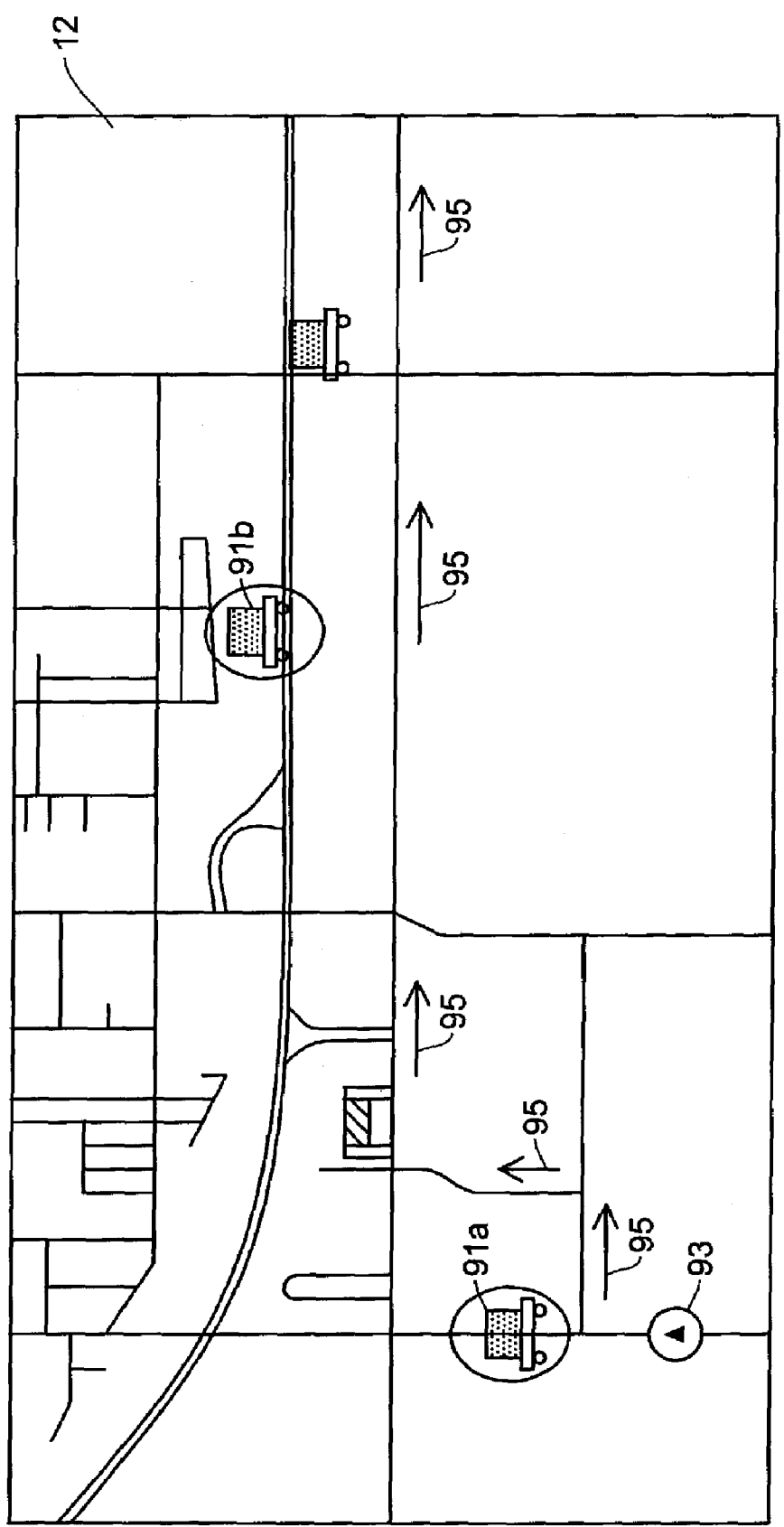

FIGS. 13A–13C show another method for selecting the traffic incidents to be reviewed and/or avoided on the map image rather than on the traffic incident list. In the examples of FIGS. 13A–13C, the calculated route to the destination is accompanied by arrows. However, various other ways of showing the calculated route to the destination are possible such as using a thicker line or a brighter line, or the like.

After selecting the icon "Image 85d" in FIG. 7, the incidents on the calculated route to the destination are displayed on the map image. Also, a cursor for selecting the incidents automatically appears. The example of FIG. 13A shows traffic incident icons 91a–91c and 92 on the calculated route, and a cursor 97 on the screen 12. The user can move the cursor 97 on the map image by, for example, operating the rotary encoder 47b of the remote controller 47 in FIG. 5A.

By pointing the cursor 97 at one of the traffic incident icons which the user wants to review the traffic information in detail, then the detailed information 99 including the text data 100 (information in characters) and the image data 101 (information in live video) of incidents will automatically pop up including the corresponding traffic incident icon (in this case, the icon 91a). The text data 100 and the image data 101 are downloaded through the wireless communication device as described above.

If the user wants to make a selection to avoid the traffic incident 91a, the user selects the incident icon 91a with the cursor 97 and presses the enter key 47a of the remote controller 47 in order to avoid the incident 91a as shown in FIG. 13B. After this operation, if the user wants to view the next incident, the user moves the cursor 97 along the guided route with the arrows 93a to view the detailed information regarding the incident 92.

By repeating the operations in this manner, the user is able to examine all of the traffic incidents and to select the traffic incidents to avoid them on the route. FIG. 13C shows an example of selecting the two traffic incidents 91a and 91b to be avoided from all the incidents. Accordingly, this example shows a new calculated route with arrows 95 to the destination which does not have the traffic incidents 91a and 91b specified by the user.

The user can review the detailed information and select all of the incidents to be avoided when the user selects the "Image 85b" menu (all incidents on map image) in the process of FIG. 7. Then, the user may review the detailed information regarding all the traffic incidents as shown in FIG. 8A and selects any traffic incidents to be avoided with the cursor which automatically appears on the screen after the selection of the menu 85b in FIG. 7.

As has been described above, according to the present invention, the navigation system is capable of displaying the traffic incidents in the manner that the user can grasp the traffic incidents quickly and easily by one or two short glances at the screen. The user can select the traffic incidents to review the detailed information which is downloaded though the wireless device. Further, the user can select the traffic incidents to be avoided so that the travel to the destination is not affected by the selected traffic incident. Then, the navigation system produces a new calculated route to the destination which does not include the traffic incidents specified by the user. Accordingly, the user can travel to the destination comfortably and with confidence.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A display method for a navigation system, comprising the following steps of:

receiving traffic information through a wireless communication device;

identifying locations of all of traffic incidents in a coverage area which includes a current position of a user of the navigation system and a calculated route to a destination where the coverage area is an area which is sufficiently large for encompassing possible routes to the destination other than the calculated route;

displaying a list of the traffic incidents that exist only on the calculated route to the destination on the navigation system;

selecting a traffic incident displayed on the navigation system to review a live image of the traffic incident downloaded through a wireless communication;

selecting two or more traffic incidents to be avoided on a route to the destination from the traffic incident list which shows the traffic incidents that exist on the calculated route to the destination; and instructing the navigation system to calculate and produce a new route to the destination which does not have the selected traffic incident and displaying the new calculated route on the navigation system;

wherein the traffic incidents are listed on the traffic incident list by two or more different icons representing predefined types of traffic incident.

2. A display method for a navigation system as defined in claim 1, wherein said step of displaying the traffic incidents includes a step of displaying all of the traffic incidents in the coverage area by the corresponding icons on a map image or a part of the traffic incidents on the calculated route to the destination by the corresponding icons on the map image.

3. A display method for a navigation system as defined in claim 2, wherein said step of selecting the traffic incident on the map image further includes a step of selecting one of the traffic incidents by pointing at the icon of the traffic incident with a cursor.

4. A display method for a navigation system as defined in claim 1, wherein said step of displaying the traffic incidents includes a step of displaying all of the traffic incidents in the coverage area in a traffic incident list by the corresponding icons or a part of the traffic incidents on the calculated route to the destination on the traffic incident list by the corresponding icons.

5. A display method for a navigation system as defined in claim 1, further comprising a step of displaying a pop-up menu which shows the detailed traffic information regarding the traffic incident specified by the user.

6. A display method for a navigation system as defined in claim 5, wherein the detailed traffic information includes text data and image data of the selected traffic incident.

7. A display method for a navigation system as defined in claim 6, wherein said image data includes a live video image of the selected traffic incident received through the wireless communication.

8. A display method for a navigation system as defined in claim 1, wherein said step of selecting the traffic incident to be avoided further includes a step of pointing at the icon of the traffic incident with a cursor, and executing the navigation system to avoid the selected traffic incident.

9. A display method for a navigation system as defined in claim 1, wherein said step of selecting the traffic incident to avoid includes a step of automatically selecting all the traffic incidents on the calculated route to the destination.

10. A display apparatus for a navigation system, comprising:

means for receiving traffic information through a wireless communication device;

means for identifying locations of all of traffic incidents in a coverage area which includes a current position of a user of the navigation system and a calculated route to a destination where the coverage area is an area which is sufficiently large for encompassing possible routes to the destination other than the calculated route;

means for displaying a list of the traffic incidents that exist only on the calculated route to the destination on the navigation system;

means for selecting a traffic incident displayed on the navigation system to review a live image of the traffic incident downloaded through a wireless communication;

means for selecting two or more traffic incidents to be avoided on a route to the destination from the traffic incident list which shows the traffic incidents that exist on the calculated route to the destination; and means for instructing the navigation system to calculate and produce a new route to the destination which does not have the selected traffic incident and displaying the new calculated route on the navigation system;

wherein the traffic incidents are listed on the traffic incident list by two or more different icons representing predefined types of traffic incident.

11. A display apparatus for a navigation system as defined in claim 10, wherein said means for displaying the traffic incidents includes means for displaying all of the traffic incidents in the coverage area by the corresponding icons on a map image or a part of the traffic incidents on the calculated route to the destination by the corresponding icons on the map image.

12. A display apparatus for a navigation system as defined in claim 11, wherein said means for selecting the traffic incident on the map image further includes means for selecting one of the traffic incidents by pointing a cursor at the icon of the traffic incident.

13. A display apparatus for a navigation system as defined in claim 10, wherein said means for displaying the traffic incidents includes means for displaying all of the traffic incidents in the coverage area in a traffic incident list by the corresponding icons or a part of the traffic incidents on the calculated route to the destination on the traffic incident list by the corresponding icons.

14. A display apparatus for a navigation system as defined in claim 10, further comprising means for displaying a pop up menu which shows the detailed traffic information regarding the selected traffic incident after the traffic incident is selected by the user.

15. A display apparatus for a navigation system as defined in claim 14, wherein the detailed traffic information includes text data and image data of the selected traffic incident.

16. A display apparatus for a navigation system as defined in claim 15, wherein said image data includes a live video image of the selected traffic incident received through the wireless communication.

17. A display apparatus for a navigation system as defined in claim 10, wherein said means for selecting the traffic incident to be avoided further includes means for pointing at the icon of the traffic incident with a cursor, and executing the navigation system to avoid the selected traffic incident.

18. A display apparatus for a navigation system as defined in claim 10, wherein said means for selecting the traffic incident to avoid includes means for automatically selecting all the traffic incidents on the calculated route to the destination.

* * * * *